Sept. 15, 1936.　　　　　O. V. LITTLE　　　　　2,054,656
ROTARY BASKET TYPE DISHWASHING MACHINE
Filed Jan. 15, 1935　　　2 Sheets-Sheet 1
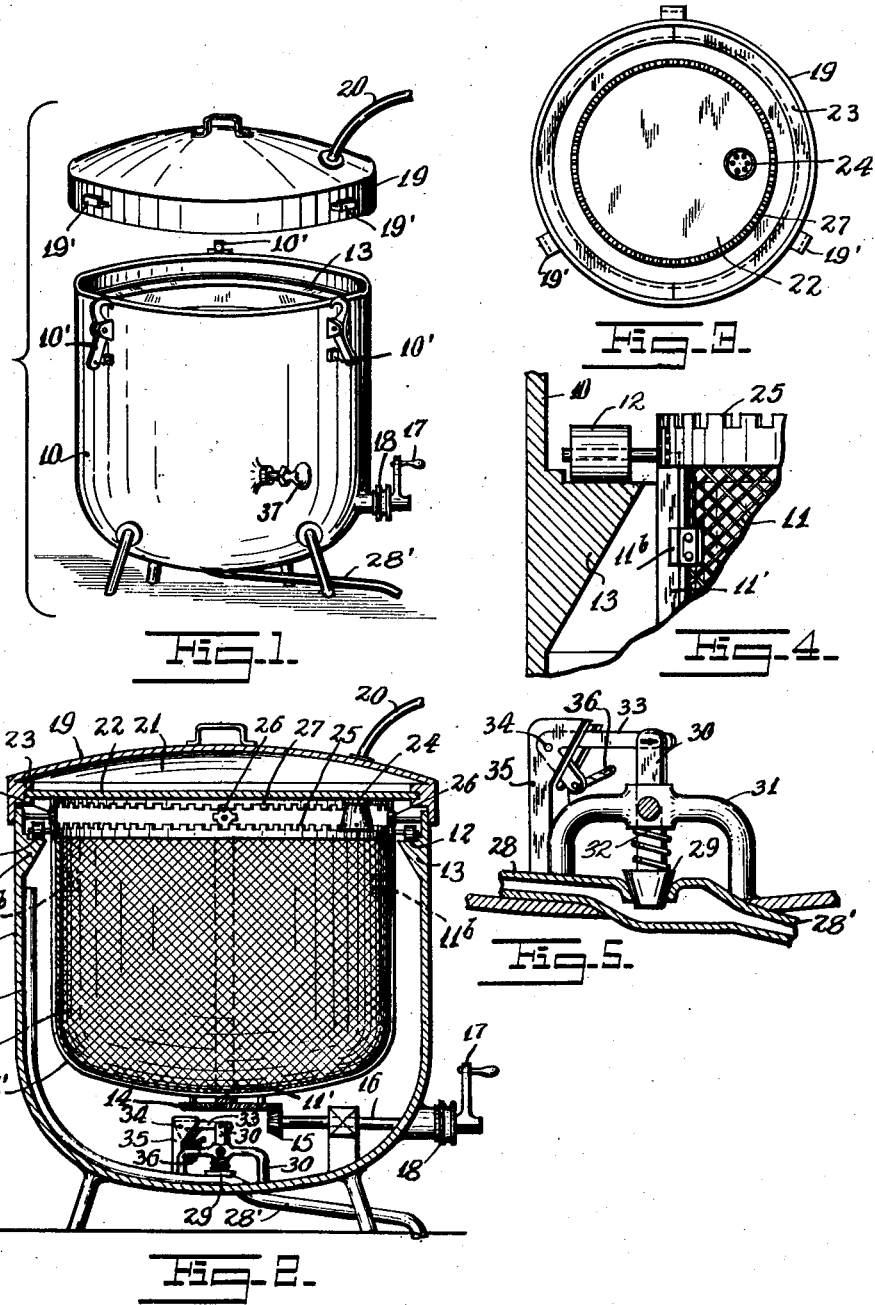
INVENTOR
OSCAR V. LITTLE
BY
ATTORNEY Sept. 15, 1936.   O. V. LITTLE   2,054,656
ROTARY BASKET TYPE DISHWASHING MACHINE
Filed Jan. 15, 1935   2 Sheets-Sheet 2
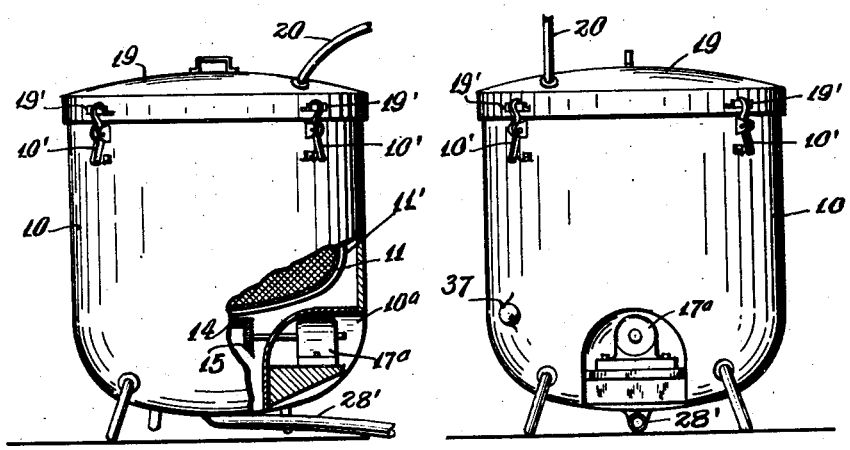
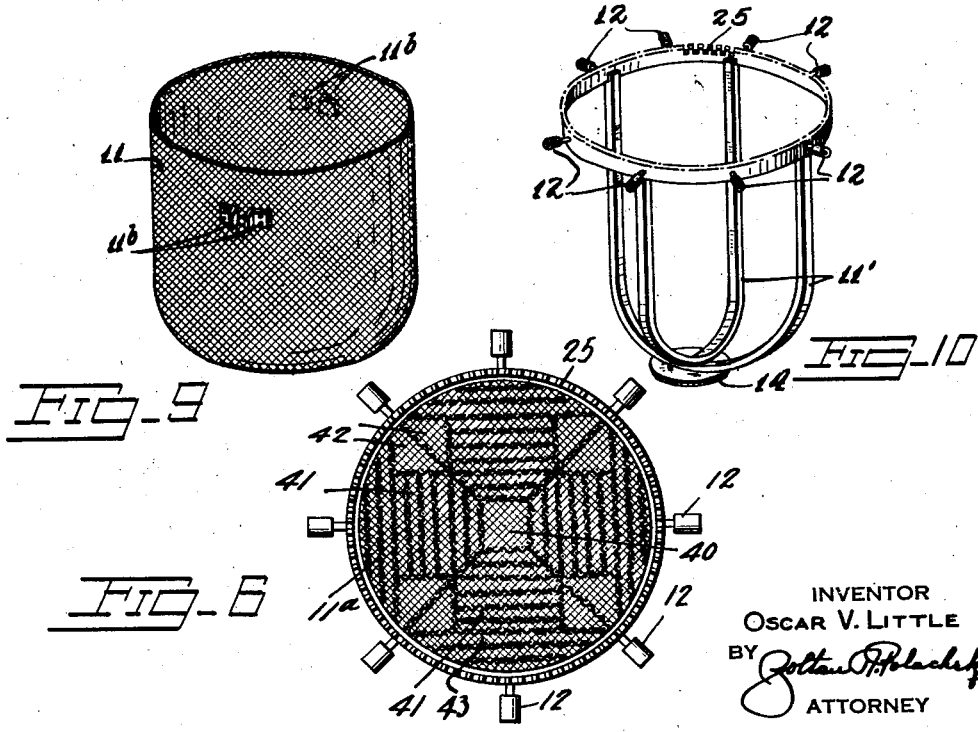
INVENTOR
OSCAR V. LITTLE
BY
ATTORNEY Patented Sept. 15, 1936

2,054,656

UNITED STATES PATENT OFFICE 2,054,656

ROTARY BASKET TYPE DISHWASHING MACHINE

Oscar V. Little, Richmond Hill, N. Y.

Application January 15, 1935, Serial No. 1,842

2 Claims. (Cl. 141—9)

This invention relates to new and useful improvements in a rotary basket dish washing machine.

This invention has for an object the construction of a device as mentioned which is characterized by the provision of a dish holding basket mounted within a container adapted to be opened at the top and mechanism for rotating the container to facilitate the washing of the dishes.

Still further the invention proposes the provision of washing fluid within the container, preferably inserted with a spray adapted to discharge from the top into the dish washing basket.

Another one of the objects of this invention is the arrangement in a device as mentioned of an overflow pipe to prevent the washing fluid in the container from overflowing the wall of the container.

A still further object of this invention is the provision of a valve control in a novel fashion and arranged to control the discharge of the liquid from the container.

Still further the invention also proposes the provision of a mechanism for causing the spray previously mentioned to rotate in the opposite direction to the rotation of the dish holding basket so as to increase the impinging force of the spray on the dishes.

Still further the invention proposes the construction of a device as mentioned which is simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a device constructed according to this invention.

Fig. 2 is a transverse vertical sectional view of the device shown in Fig. 1.

Fig. 3 is a bottom plan view of the cover of the device illustrated per se.

Fig. 4 is a fragmentary enlarged detailed view of a portion of Fig. 2.

Fig. 5 is another fragmentary enlarged detailed view of a portion of Fig. 2.

Fig. 6 is a plan view of a dish holding basket of a different type adapted to be used in the dish washing machine.

Fig. 7 is a side elevational view of the device with a motor drive illustrated partly in section.

Fig. 8 is a rear elevational view of Fig. 7.

Fig. 9 is a perspective view of a dish washing basket used in the washing machine.

Fig. 10 is a perspective view of the basket supporting frame.

The device according to this invention includes a container 10 which is open at the top a dish holding basket 11 is adapted to engage a basket holding frame 11' which is rotatively supported in the container. A plurality of rollers 12 are mounted upon the periphery of the basket holding frame 11' and engage upon a track 13 secured upon the inner wall of the container 10 for the rotative supporting of the dish basket. The basket 11 is provided with a plurality of lugs 11ᵇ for engaging the basket holding frame 11'.

A bevel gear 14 is horizontally fixed on the bottom of the basket supporting frame 11' coaxially therewith and meshes with a bevel pinion 15 upon a shaft 16 rotatively mounted and extended through the container to the exterior. A handle 17 is fixed upon the shaft 16 by which it may be manually rotated. The shaft is also equipped with a pulley 18 and a belt of a power drive.

A cover 19 is provided for the container 10. The cover 19 is provided with radial lugs 19' which may be engaged by corresponding locking catches 10' located on the container 10. This cover is equipped with a water spraying device. More particularly an inlet pipe 20 discharges into a compartment 21 within the cover formed by a disc 22 which is rotatively mounted at its periphery in a supporting member 23 arranged with a groove. A spray nozzle 24 is eccentrically mounted upon the disc 22 and is adapted to spray into the dish holding basket.

A means is provided for rotating the disc 22 in the opposite direction to the rotation of the basket and comprises a ring gear 25 fixed upon the basket supporting frame and meshing with several pinions 26 rotatively supported upon the inner wall of the container 10. These pinions 26 also mesh with a ring gear 27 mounted coaxially with ring gear 25 on the disc 22.

The device is provided with an overflow pipe 28. This pipe extends from a distance slightly down from the top of the container through the bottom of the container at the area 28' to connect with a water discharge. A water discharge valve 29 is associated with the overflow 28 in such a manner that the container may be emptied when desired. This valve 29 is fixed upon a stem 30 slidable through a bracket 31 stationarily mounted. A spring 32 is arranged upon the stem 30 and urges the valve 29 into its closed position against a seat formed in the top of the pipe 28 at the area of the valve. A bell crank 33 is pivotally mounted intermediately at 34 upon a stationary bracket 35. One end of the bell crank connects with the stem 30. A cable 36 is connected with the other end of the bell crank and extends through the side of the container 10. A knob 37 is mounted upon the extended end of the cable by which the valve may be manually opened. A tubing may cover the cable 36 within the container.

In Fig. 6 a dish basket 11a is illustrated which distinguishes from the basket 11 in the provision of numerous partitions to divide off compartments for different utensils. This basket is formed with a central compartment 40 adapted for silverware, with several large compartments 41 adapted for plates, several compartments 42 adapted for cups, and several exterior compartments 43 adapted for covers or other similar parts. These various compartments are formed with radial and transverse mesh material partitions as clearly shown on the drawings. The dish holding basket 11a is provided with a ring gear 25 similar and for the same purpose as the corresponding ring gear of the basket 11. Also a plurality of rollers 12 are mounted on the periphery of the basket for coaction with the track 13.

In Figs. 7 and 8, a motor 17a is illustrated as the driving means for a bevel pinion 15. The motor is inserted in a compartment 10a at the bottom of container 10. In other respects this construction is the same as that shown in the previous figures.

The operation of the device is as follows:

Dishes to be washed are stacked within the dish holding basket. Preferably these dishes should be so stacked between the partitions of the basket that there are no large contacting surfaces. The cover is then engaged upon the container and the washing fluid turned on to discharge through the pipe into the compartment 21 of the cover. Simultaneously the dish holding basket is caused to rotate by the mechanism provided for this purpose. Rotation from the dish holding basket will be transmitted to the disc 22 so as to cause the nozzle 24 to rotate in an opposite direction and discharge its spray on the dishes in the basket.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. In a rotary dish washing machine, a container open at the top, a dish holding basket, a frame supporting said basket, said frame rotatively supported in the container, means for rotating said frame, a hollow cover for the container, a disc rotatively mounted across the bottom of the cover for dividing off a water compartment, a spray opening eccentric on the disc discharging into the basket, a water inlet into the compartment of said cover, and means for rotating said disc.

2. In a rotary dish washing machine, a container open at the top, a dish holding basket, a frame supporting said basket, said frame rotatively supported in the container, means for rotating said frame, a hollow cover for the container, a disc rotatively mounted across the bottom of the cover dividing off a water compartment, a spray opening eccentric on the disc discharging into the basket, a water inlet into the compartment of said cover, and means for rotating said disc, comprising a ring gear upon the frame meshing with pinions supported upon said container, said pinions in turn meshing with a ring gear fixed upon said disc.

OSCAR V. LITTLE.